United States Patent
Choi et al.

(10) Patent No.: US 11,722,635 B2
(45) Date of Patent: Aug. 8, 2023

(54) PROCESSING DEVICE, ELECTRONIC DEVICE, AND METHOD OF OUTPUTTING VIDEO

(71) Applicant: Samsung Electronics Co., Ltd., Suwon-si (KR)

(72) Inventors: Jonghyun Choi, Suwon-si (KR); Sangmin Shim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/838,738

(22) Filed: Jun. 13, 2022

(65) Prior Publication Data

US 2022/0408057 A1 Dec. 22, 2022

(30) Foreign Application Priority Data

Jun. 22, 2021 (KR) .................. 10-2021-0081030
Apr. 1, 2022 (KR) .................. 10-2022-0041331

(51) Int. Cl.
*H04N 7/01* (2006.01)

(52) U.S. Cl.
CPC .................. *H04N 7/0127* (2013.01)

(58) Field of Classification Search
CPC ...... H04N 7/0127; H04N 7/0112; H04N 7/01; H04N 7/0115
USPC .................. 348/441, 458, 459
See application file for complete search history.

(56) References Cited

U.S. PATENT DOCUMENTS

| | | | |
|---|---|---|---|
| 7,075,581 B1 * | 7/2006 | Ozgen | H04N 7/0115 348/E7.015 |
| 7,508,449 B1 | 3/2009 | Greenberg | |
| 8,284,839 B2 | 10/2012 | Chang et al. | |
| 8,488,058 B2 | 7/2013 | Kang | |
| 8,693,552 B2 | 4/2014 | Doswald | |
| 8,836,866 B2 | 9/2014 | Haastrup | |
| 8,842,742 B2 | 9/2014 | Cordes et al. | |
| 2007/0200838 A1 | 8/2007 | Lee et al. | |
| 2010/0039517 A1 | 2/2010 | Znamenskiy et al. | |
| 2010/0254453 A1 | 10/2010 | Dane et al. | |

(Continued)

FOREIGN PATENT DOCUMENTS

| | | |
|---|---|---|
| JP | 2009-159321 A | 7/2009 |
| JP | 5241632 B2 | 7/2013 |
| JP | 2014-033255 A | 2/2014 |

(Continued)

OTHER PUBLICATIONS

Extended European Search Report dated Oct. 28, 2022 for corresponding European Application No. 22179805.1.

*Primary Examiner* — Sherrie Hsia

(74) *Attorney, Agent, or Firm* — Harness, Dickey & Pierce, P.L.C.

(57) ABSTRACT

Provided are a processing device, an electronic device, and a method of outputting a video. The processing device includes a pull-down cadence detector configured to receive an input video stream generated by pulling down raw data from an external device, detect a pull-down cadence format indicating a rate at which the raw data is pulled down based on the input video stream, and output detection result information; and a pull-down cadence controller configured to output an output video stream having a second frame rate that is an integer multiple of a first frame rate of the raw data, based on the input video stream and the detection result information.

14 Claims, 13 Drawing Sheets

(56) References Cited

U.S. PATENT DOCUMENTS

2011/0001873 A1* 1/2011 Doswald ............... H04N 7/013
   348/E7.003
2016/0134827 A1   5/2016 Kim et al.

FOREIGN PATENT DOCUMENTS

KR   101486254 B1   1/2015
KR   101717718 B1   3/2017

* cited by examiner

FIG. 8

| SOURCE FRAME RATE | INPUT PULL-DOWN CADENCE FORMAT | INPUT FRAME RATE | OUTPUT PULL-DOWN CADENCE FORMAT | OUTPUT FRAME RATE |
|---|---|---|---|---|
| 24 | 3:2 | 60 | 2:2 | 48 |
| 24 | 2:2:2:4 | 60 | 2:2 | 48 |
| 24 | 2:3:3:2 | 60 | 2:2 | 48 |
| 25 | 2:3:3:2:2 | 60 | 2:2 | 50 |
| 25 | 3:2:3:2:2 | 60 | 2:2 | 50 |
| 25 | 2:2:2:2:4 | 60 | 2:2 | 50 |
| 24 | 2:2:2:2:2:2:2:2:2:2:3 | 50 | 2:2 | 48 |
| 48 | 2:1:1:1 | 60 | 1 | 48 |
| 50 | 2:1:1:1:1 | 60 | 1 | 50 |
| 30 | 2:2:1 | 50 | 2:2 | 60 |
| 50 | 3:1:1:1:1:1:1:1:1 | 60 | 1 | 50 |

PROCESSING DEVICE, ELECTRONIC DEVICE, AND METHOD OF OUTPUTTING VIDEO

CROSS-REFERENCE TO RELATED APPLICATIONS

This application is based on and claims priority under 35 U.S.C. § 119 to Korean Patent Application Nos. 10-2021-0081030, filed on Jun. 22, 2021, and 10-2022-0041331, filed on Apr. 1, 2022, in the Korean Intellectual Property Office, the disclosures of which are incorporated by reference herein in their entireties.

BACKGROUND

The inventive concepts relate to an electronic device, and more particularly, to a processing device, an electronic device, and a method of outputting video.

In general, a video signal is not transmitted as raw data to a receiving side. Rather, a video signal is compressed in a standardized compression format and encoded data is transmitted. To comply with a broadcasting standard determined for each nation, the frame rate of encoded data may be converted into a frame rate demanded by the broadcasting standard. For example, the national television system committee (NTSC) or advanced television standards committee (ATSC), which are analog or digital broadcasting standards in Korea, the United States, and Japan, requires 60 frames per second (FPS), and encoded data needs to be converted to satisfy 60 FPS. To conform to a frame rate required by the broadcasting standard, a process of converting the frame rate of encoded data may be performed according to a pull-down method.

There are various types of pull-down methods. However, when a specific pull-down method is applied, a specific frame may be repeated more than other frames. In some example embodiments, motion judder, which is a phenomenon in which the user feels like a video is shaking, may occur.

Research for reducing such motion judder is increasing. For example, a method using motion estimation (ME)/motion compensation (MC) is a method of smoothing motion by interpolating new frames between frames. However, even with the ME/MC method, side effects like a halo, which is a phenomenon that an afterimage like a halo remains in a video, may occur. Also, a video may be broken because a region, in which it is difficult to accurately find motion, e.g., an occlusion region or a high frequency region, occurs. Also, a soap opera effect, which is a phenomenon in which a user feels reluctance softening of motion of a video by the ME/MC method, may occur. Also, significant video latency (or input/output delays) may occur in the ME/MC method.

SUMMARY

The inventive concepts provide a processing device, an electronic device, and method of outputting a video for linearly changing a detected particular pull-down cadence format.

According to an aspect of the inventive concepts, there is provided a processing device including a pull-down cadence detector configured to receive an input video stream generated by pulling down raw data from an external device, detect a pull-down cadence format indicating a rate at which the raw data is pulled down based on the input video stream, and output a detection result information; and a pull-down cadence controller configured to output an output video stream having a second frame rate that is an integer multiple of a first frame rate of the raw data, based on the input video stream and the detection result information.

According to another aspect of the inventive concepts, there is provided an electronic device including a processor configured to receive an input video stream generated by pulling-down raw data from an external device, detect a pull-down cadence format indicating a ratio at which the raw data is pulled down based on the input video stream, and output an output video stream having a second frame rate that is an integer multiple of a first frame rate of the raw data based on the pull-down cadence format; and a display configured to display a video corresponding to the output video stream.

According to another aspect of the inventive concepts, there is provided a method of outputting video, the method including receiving an input video stream generated by pulling down raw data from an external device; detecting a pull-down cadence format indicating a rate at which the raw data is pulled down based on the input video stream; and outputting an output video stream having a second frame rate that is an integer multiple of a first frame rate of the raw data based on a detected pull-down cadence format.

According to another aspect of the inventive concepts, there is provided a processing device including a pull-down driver configured to pull down raw data provided from a storage device and output an input video stream generated by pulling down the raw data; a pull-down cadence detector configured to detect a pull-down cadence format indicating a ratio at which the raw data is pulled down based on the input video stream and output detection result information; and a pull-down cadence controller configured to output an output video stream having a second frame rate that is an integer multiple of a first frame rate of the raw data, based on the input video stream and the detection result information.

BRIEF DESCRIPTION OF THE DRAWINGS

Example embodiments of the inventive concepts will be more clearly understood from the following detailed description taken in conjunction with the accompanying drawings in which:

FIG. 8 is a diagram showing an example of a table for determining the frame rate of output video data according to a detected pull-down cadence format;

DETAILED DESCRIPTION OF EXAMPLE EMBODIMENTS

Figure 1:
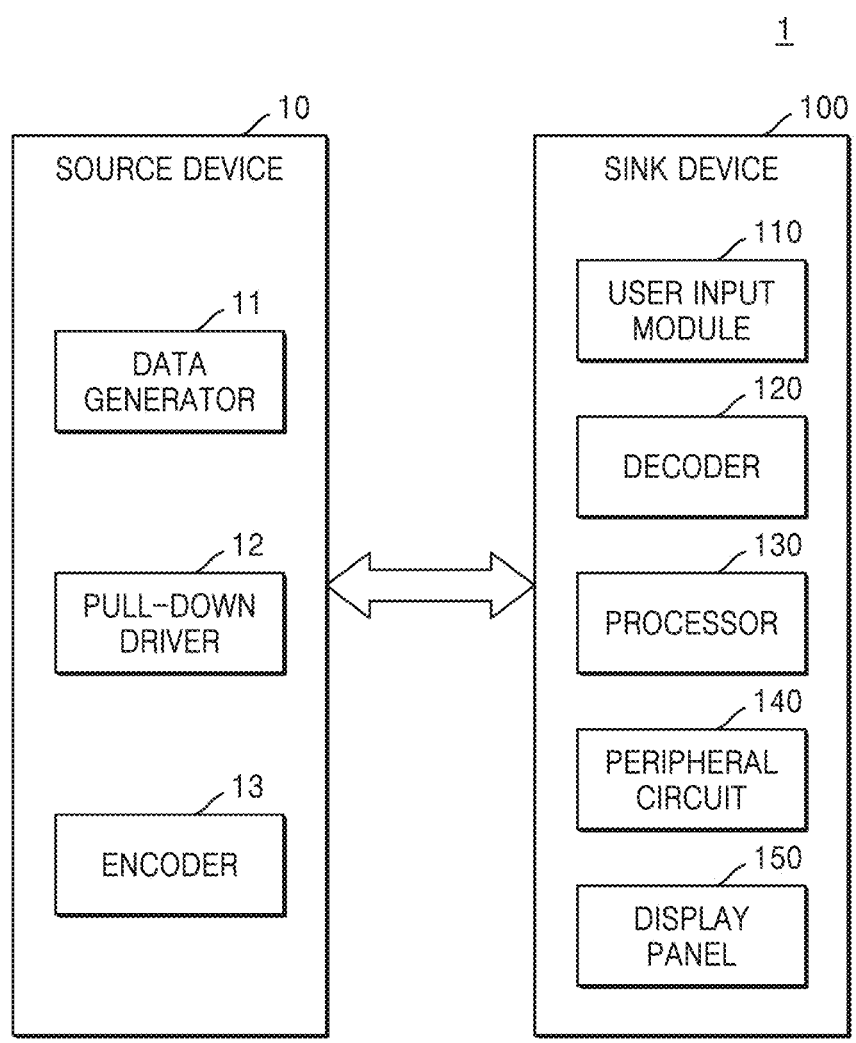
FIG. 1 is a diagram for describing a video output system according to example embodiments of the inventive concepts.

FIG. 1 is a diagram for describing a video output system according to example embodiments of the inventive concepts.

Referring to FIG. 1, a video output system 1 may include a source device 10 and/or a sink device 100.

The source device 10 may provide content to the sink device 100. The source device 10 may be implemented as various types of devices capable of wirelessly providing content, e.g., a broadcasting station or an image server connected through a digital network. The source device 10 may be implemented as various types of electronic devices capable of providing content to the sink device 100, e.g., a set-top box, a DVD player, a Blu-ray disc player, a PC, and a game machine. However, the inventive concepts are not limited thereto.

In some example embodiments, the source device 10 may include a data generator 11, a pull-down driver 12, and/or an encoder 13.

The data generator 11 may generate raw data. The data generator 11 may be implemented as various devices, e.g., a camera. In example embodiments, raw data generated by the data generator 11 may have a particular frame rate. For example, the frame rate of raw data may be 24 frames per second (FPS), 30 FPS, or 50 FPS, but is not limited thereto. In some example embodiments, FPS indicates the number of frames per second and is a unit of frame rate. A frame may be one still image.

For example, it will be assumed that the frame rate of raw data is 30 FPS. To efficiently provide raw data to a receiver according to a broadcast standard requiring 60 FPS, a process of converting raw data of 30 FPS into data of 60 FPS is necessary in addition to a process of encoding the raw data into a particular compression format. In some example embodiments, the raw data may have a frame rate that is different from the original frame rate by being encoded into a particular compression format. To comply with a broadcast standard or a compression format, raw data may be converted into data having a higher frame rate than the original frame rate. Such a conversion process may be performed according to a pull-down method.

The pull-down driver 12 may pull-down raw data according to a pull-down method. The pull-down method may be a method of converting consecutive frames according to a particular pull-down cadence format. The pull-down cadence format may be determined based on a ratio between a frame rate of raw data and a required frame rate. In other words, the pull-down cadence format may indicate a ratio at which raw data is pulled down. For example, the pull-down cadence format may be 2:2, 3:2, 2:3:3:2, 2:2:2:4, etc. For example, when raw data has a frame rate of 24 FPS and a required frame rate is 60 FPS, a pull-down cadence format to be applied may be 3:2. In some example embodiments, an A frame may be extended to three frames according to the pull-down cadence format of 3:2 and a B frame which is consecutive with the A frame may be two frames according to the pull-down cadence format of 3:2. In another example, when raw data has a frame rate of 24 FPS and a required frame rate is 48 FPS, a pull-down cadence format to be applied may be 2:2. Frames may be extended through a repeated frame method of identically repeating each frame, an interlaced frame method of dividing each frame into a plurality of line groups and dividing frames in correspondence to the line groups, etc.

The encoder 13 may encode pull-down processed data. The encoder 13 may output a video stream. The video stream is data that is sequentially transmitted bit-by-bit and data encoded in a standardized compression format. In some example embodiments, the standardized compression format may include, for example, MPEG-4, WMV, DivX, or H.264, but is not limited thereto. A video stream may include content. For example, a video stream may include a plurality of frames in the unit of a certain bit, an error correction code, and other additional information.

The sink device 100 may be an electronic device that processes and reproduces a video stream. Here, the term "reproduction" may mean displaying a video according to processed video data, outputting audio according to processed audio data, or displaying a video and audio according to processed video data and processed audio data. The sink device 100 may be implemented in various forms, e.g., a TV, a monitor, a portable multimedia player, a mobile phone, a tablet PC, an electronic picture frame, an electronic blackboard, an electronic billboard, etc. In the present specification, a "sink device" may be referred to as an "electronic device".

In some example embodiments, the sink device 100 may include a user input module 110, a decoder 120, a processor 130, a peripheral circuit 140, and/or a display panel 150.

The user input module 110 may be a module provided to be manipulated by a user. The user input module 110 may include various types of input interface-related circuits. For example, the user input module 110 may be implemented in various forms, e.g., mechanical or electronic buttons of the sink device 100, a remote controller separated from the body of the sink device 100, a touchpad, a touchscreen, etc.

In some example embodiments, the user input module 110 may receive a selection signal indicating information selected by a user and transmit the selection signal to the processor 130. Information selected by a user may be information instructing to turn on or off a particular function. For example, a video stream received from the source device 10 may be displayed on the display panel 150 as it is or a video stream generated by the processor 130 may be displayed on the display panel 150 as it is, according to information selected by a user.

The decoder 120 may decode a video stream received from the source device 10. A "video stream received from the source device 10" may be referred to as an "input video stream".

The processor 130 may detect a pull-down cadence format based on a decoded input video stream. The processor 130 may output an output video stream having a second frame rate that is an integer multiple of a first frame rate of the raw data based on a detected pull-down cadence format. For example, the processor 130 may or may not change the pull-down cadence format of the input video stream according to the type of a detected pull-down cadence format. When the pull-down cadence format of the input video stream is changed, the frame rate of the input video stream may be changed. In other words, the frame rate of a video stream output from the processor 130 may be different from the frame rate of the input video stream. In some example embodiments, the "video stream output from the processor 130" may be referred to as an "output video stream". When the pull-down cadence format of the input video stream is not changed, the processor 130 may output the input video stream to the peripheral circuit 140 as it is. In this specification, a "processor" may also be referred to as a "host", a "processing device", a "processing module", or a "processing unit". The integer multiples may include, for example, 1 time, 2 times, 3 times, 4 times, and so on. When the integer multiple is 1 time, the frame rate of raw data may be the same as the frame rate of an output video stream.

In some example embodiments, the processor 130 may output an output video stream to the peripheral circuit 140 by bypassing an input video stream to the peripheral circuit 140 or changing the frame rate of the input video stream and output an output video stream according to the type of the pull-down cadence format. Example embodiments of changing the frame rate of an input video stream will be described later with reference to FIGS. 6 to 8. Detailed description of bypassing will be given later with reference to FIG. 9.

In some example embodiments, when the user input module 110 provides a selection signal to the processor 130, the processor 130 may bypass an input video stream to the peripheral circuit 140 in response to the selection signal.

The peripheral circuit 140 may control the display panel 150 to display an output video stream. Detailed description of the peripheral circuit 140 will be given later with reference to FIG. 13.

The display panel 150 may visually display a video stream. The display panel 150 may include pixels. Pixels may be defined by data lines and scan lines. Detailed description of the display panel 150 will be given later with reference to FIG. 13.

In this specification, a component including a "peripheral circuit" and a "display panel" may be referred to as a "display module". The display module may be configured to display images corresponding to an output video stream.

Figure 2:
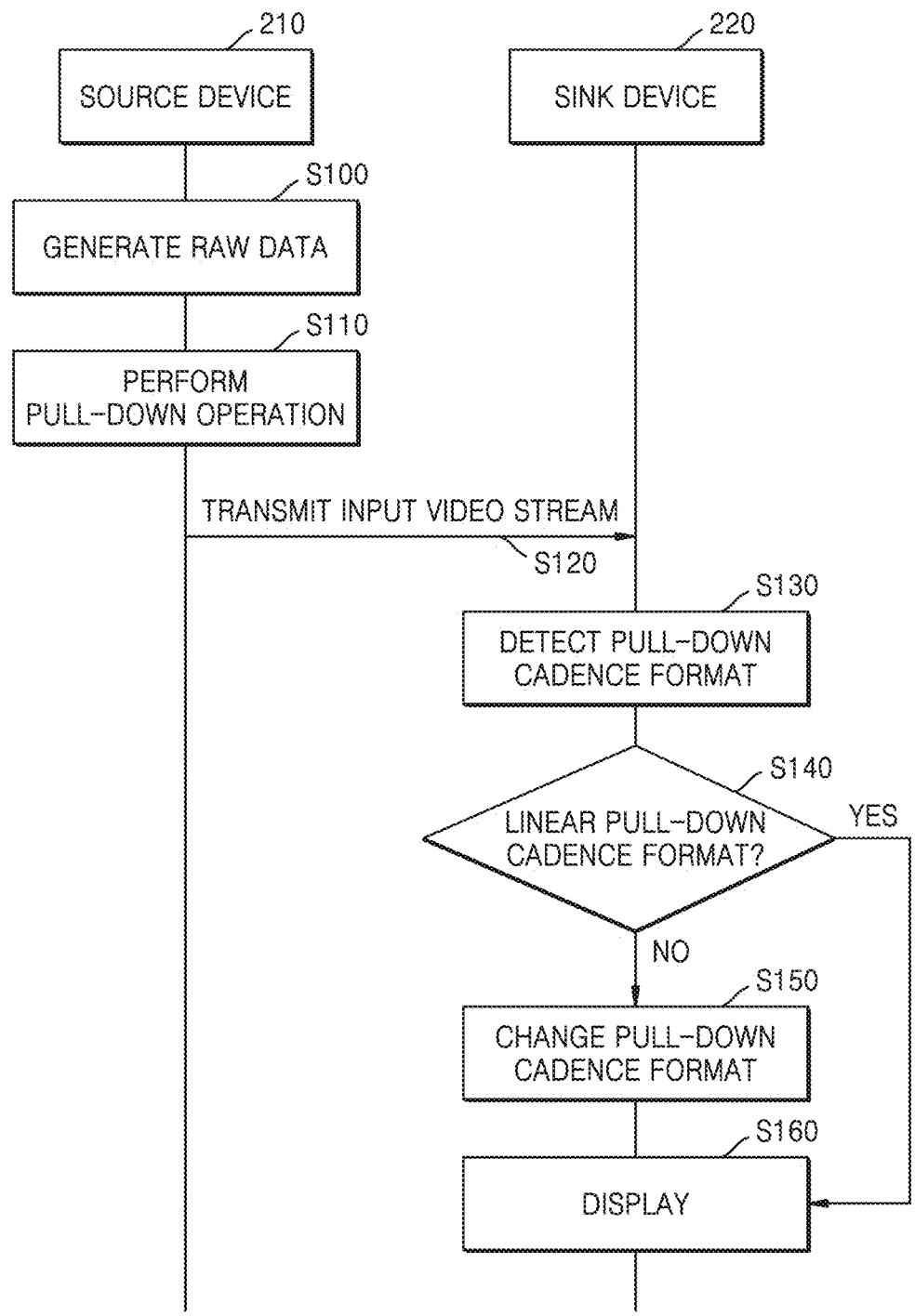
FIG. 2 is a flowchart of a method of outputting a video, according to example embodiments of the inventive concepts.

FIG. 2 is a flowchart of a method of outputting a video, according to example embodiments of the inventive concepts.

Referring to FIG. 2, a source device 210 and a sink device 220 may correspond to the source device 10 and the sink device 100 shown in FIG. 1, respectively.

In operation S100, the source device 210 generates raw data.

In operation S110, the source device 210 performs a pull-down operation. For example, the source device 210 pulls down the raw data according to a pre-set pull-down cadence format. Pulled-down raw data may be referred to as an input video stream.

In operation S120, the source device 210 transmits the input video stream to the sink device 220 through a wired communication network or a wireless communication network. The sink device 220 receives the input video stream.

In operation S130, the sink device 220 detects a pull-down cadence format based on the input video stream. The pull-down cadence format indicates a ratio at which the raw data is pulled down.

The sink device 220 outputs an output video stream having a frame rate (e.g., the above-stated second frame rate) that is an integer multiple of the frame rate of the raw data (e.g., the above-stated first frame rate), based on a detected pull-down cadence format.

For example, in operation S140, the sink device 220 determines whether the detected pull-down cadence format is a linear pull-down cadence format. The linear pull-down cadence format may indicate a pull-down ratio in which the frame rate of the input video stream is an integer multiple of the frame rate of the raw data (e.g., the above-stated first frame rate). For example, the linear pull-down cadence format may be 2:2, but is not limited thereto. Hereinafter, for convenience, the "frame rate of raw data" will be referred to as a "first frame rate", the "frame rate of an output video stream" will be referred to as a "second frame rate", and the "frame rate of an input video stream" will be referred to as a "third frame rate".

When the pull-down cadence format is a linear pull-down cadence format (S140, YES), in operation S160, the input video stream is bypassed, and the sink device 220 displays a video corresponding to the input video stream.

When the pull-down cadence format is a non-linear pull-down cadence format (S140, NO), the sink device 220 changes the pull-down cadence format of the input video stream in operation S150. For example, the sink device 220 outputs an output video stream by changing the third frame rate to the second frame rate.

In some example embodiments, the non-linear pull-down cadence format may indicate a pull-down ratio in which the third frame rate is a decimal multiple of the first frame rate. In other words, the non-linear pull-down cadence format may refer to any format other than a linear pull-down cadence format. For example, the non-linear pull-down cadence format may be 3:2, but is not limited thereto. In some example embodiments, the decimal multiple may include, for example, 1.1 times, 2.1 times, 2.3 times, 2.7 times, and so on.

After operation S150, in operation S160, the sink device 220 displays a video corresponding to the output video stream.

Although not shown in FIG. 2, as described above with reference to FIG. 1, the sink device 220 bypasses an input video stream as an output for displaying a video in response to a selection signal generated by a user's selection. This operation may be performed between operations S130 to S150, but is not limited thereto.

Figure 3:
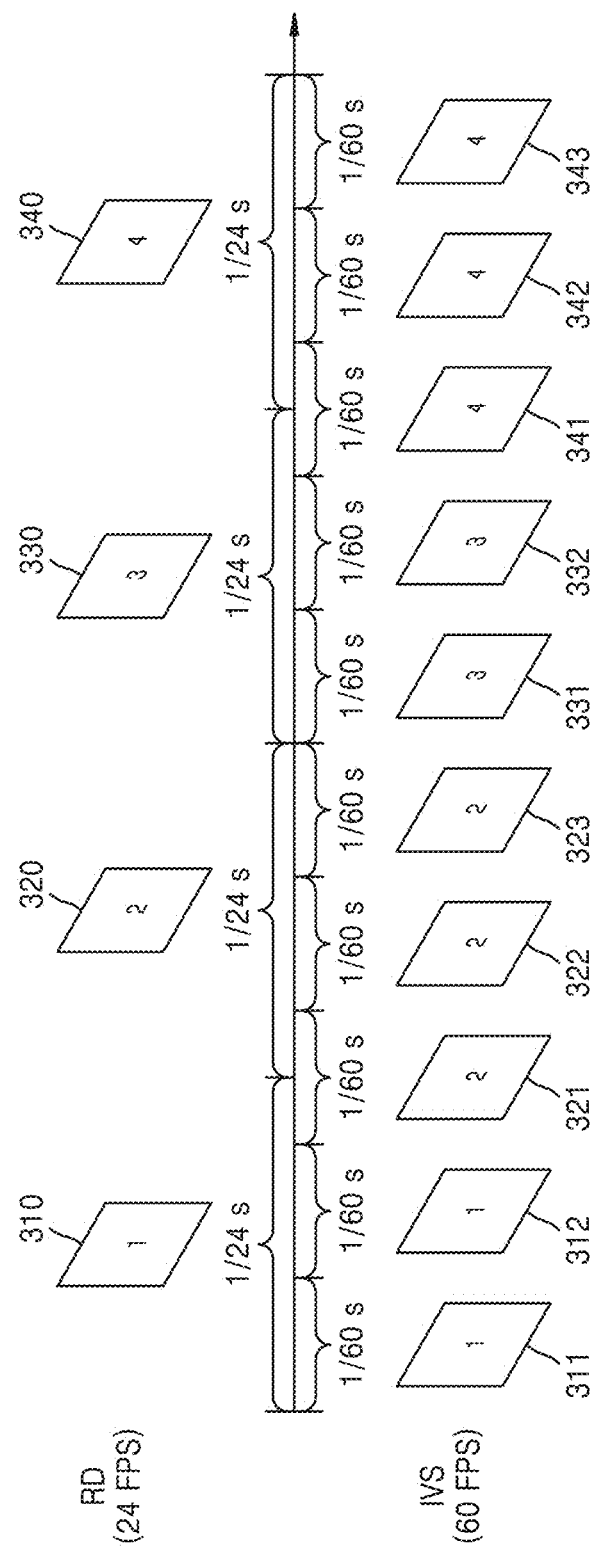
FIG. 3 is a diagram for describing a pull-down processing method according to example embodiments of the inventive concepts.

FIG. 3 is a diagram for describing a pull-down processing method according to example embodiments of the inventive concepts.

Referring to FIGS. 1 and 3, raw data RD may include a plurality of consecutive frames 310, 320, 330, and 340. Assuming that the frame rate of the raw data RD is 24 FPS, a new frame may be generated every ¹⁄₂₄ seconds.

The pull-down driver 12 may pull-down the raw data RD based on a pre-set pull-down cadence format. In some example embodiments, the pulling down may be a method of repeating each of the consecutive frames 310, 320, 330, and 340 according to a pull-down ratio corresponding to the pull-down cadence format.

Referring to FIG. 3, for example, it is assumed that the pre-set pull-down cadence format is 3:2. A frame 310 marked with "1" is extended to two frames 311 and 312. Any one of the two frames 311 and 312 is the frame 310 marked with "1", and the other one of the two frames 311 and 312 is a duplicate frame of the frame 310 marked with "1". A frame 320 marked with "2" is extended to three frames 321, 322, and 323. Any one of the three frames 321, 322, and 323 may be the frame 320 marked with "2", and the other two of the three frames 321, 322, and 323 may be duplicate frames.

A frame 330 marked with "3" is extended into two frames 331 and 332, in the same way as the frame 310 marked with "1". A frame 340 marked with "4" is extended to three frames 341, 342, and 343 in the same way as the frame 320 marked with "2".

When the frame rate of the raw data RD (e.g., the first frame rate) is 24 FPS and the pre-set pull-down cadence format is 3:2, the frame rate of an input video stream IVS (e.g., the third frame rate) is 60 FPS. In other words, the third frame rate is 2.5 times the first frame rate.

The processor 130 may compare two consecutive frames of the input video stream IVS to each other, calculate a degree of consistency between the two consecutive frames numerically (e.g., from 0 to 100), and compare a calculated value with a threshold value set in advance. The threshold value may be a value for determining that consecutive frames are almost identical, that is, a reference value for determining a pulled-down stream.

Two consecutive frames of the input video stream IVS may be, for example, as shown in FIG. 3, the two frames 311 and 312 marked with "1", two frames 312 and 321 respectively marked with "1" and "2", two consecutive frames 321 and 322 marked with "2", other two consecutive frames 322 and 323 marked with "2", two frames 322 and 331 respectively marked with "2" and "3", two frames 331 and 332 marked with "3", two frames 332 and 341 respectively marked with "3" and "4", two consecutive frames 341 and 342 marked with "4", and other two consecutive frames 342 and 343 marked with "4".

For example, it is assumed that the value indicating the degree of consistency between frames is between 0 and 100 and the threshold value is 90. Degrees of consistency between all sets of two consecutive frames shown in FIG. 3 (e.g., 311 and 312, 312 and 321, 321 and 322, 322 and 323, 323 and 331, 331 and 332, 332 and 341, 341 and 342, and 342 and 343) may be 100, 40, 100, 100, 45, 100, 46, 100, and 100, respectively.

The processor 130 may determine consecutive frames to be pulled-down streams from results of comparisons other than results of comparisons regarding the two frames 312 and 321 respectively marked with "1" and "2", the two frames 323 and 331 respectively marked with "2" and "3", and the two frames 332 and 341 respectively marked with "3" and "4". The processor 130 may generate information indicating that second, fourth, fifth, seventh, ninth, and tenth frames from among consecutive frames 311, 312, 321 to 323, 331, 332, and 341 to 343 are repeated frames.

Figure 4:
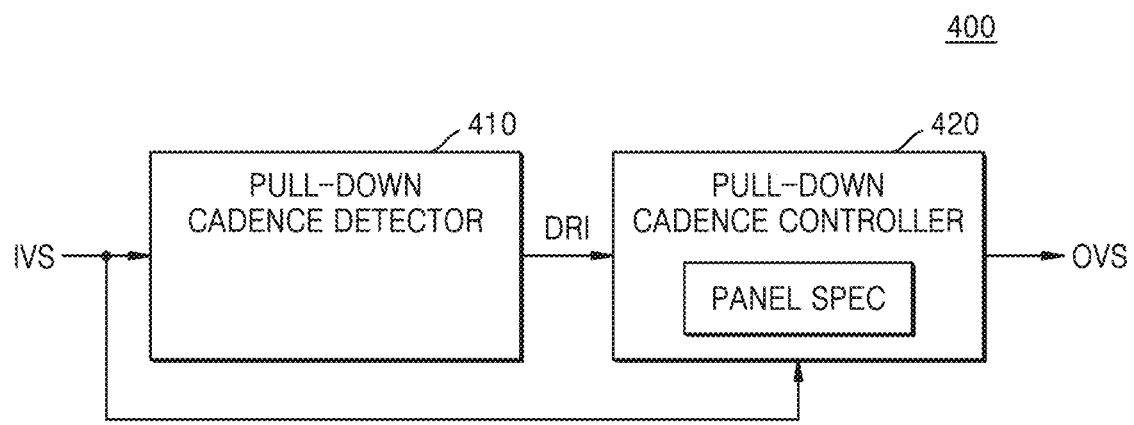
FIG. 4 is a diagram for describing a processor according to example embodiments of the inventive concepts.

FIG. 4 is a diagram for describing a processor according to example embodiments of the inventive concepts.

Referring to FIG. 4, a processor 400 may correspond to the processor 130 described above with reference to FIG. 1. The processor 400 may receive an input video stream IVS from an external device, detect a pull-down cadence format based on the input video stream IVS, and output an output video stream OVS based on the pull-down cadence format. In some example embodiments, the external device may be the sink device 100 shown in FIG. 1.

In some example embodiments, the processor 400 may include a pull-down cadence detector 410 and/or a pull-down cadence controller 420.

The pull-down cadence detector 410 may receive the input video stream IVS, detect a pull-down cadence format based on the input video stream IVS, and output detection result information DRI. As described above with reference to FIG. 3, the pull-down cadence detector 410 may compare two consecutive frames of the input video stream IVS, calculate the degree of consistency between the two consecutive frames numerically, and compare a calculated value with a pre-set (or alternatively, desired or given), threshold value. In other example embodiments, the pull-down cadence detector 410 may detect a pull-down cadence format by calculating a frame sum of absolute difference (SAD). The frame SAD may be a method of checking a pattern of two consecutive frames to determine whether the two consecutive frames are identical to each other by using the sum of all pixel differences between the two consecutive frames. The detection result information DRI may include information regarding a pull-down cadence format. For example, the detection result information DRI may include information indicating the type of a pull-down cadence format, information indicating repeated frames from among consecutive frames (e.g., 311, 312, 321 to 323, 331, 332, and 341 to 343 shown in FIG. 3), information indicating a position of a current frame from among frames included in the input video stream IVS. However, the inventive concepts are not limited thereto.

The pull-down cadence controller 420 may output an output video stream OVS, based on the input video stream IVS and the detection result information DRI.

In some example embodiments, when the detection result information DRI includes information indicating the type of the pull-down cadence format, the pull-down cadence controller 420 may output the output video stream OVS by bypassing the input video stream IVS or changing the third frame rate of the input video stream IVS to the second frame rate according to the type of the pull-down cadence format. In some example embodiments, the second frame rate may be an integer multiple of the first frame rate of raw data. For example, when the type of the pull-down cadence format is a linear pull-down cadence format, the pull-down cadence controller 420 may bypass the input video stream IVS. Alternatively, when the type of the pull-down cadence format is a non-linear pull-down cadence format, the pull-down cadence controller 420 may output the output video stream OVS. As a result, motion judder may be reduced and the soap opera effect may be reduced or prevented.

In some example embodiments, the pull-down cadence controller 420 may store performance information PANEL SPEC regarding the performance of a peripheral circuit (e.g., the peripheral circuit 140 shown in FIG. 1) and/or a display panel (e.g., the display panel 150 shown in FIG. 1). For example, a designer who designs the processor 400 may code the performance information PANEL SPEC into the pull-down cadence controller 420 by using software. The performance information PANEL SPEC may be, for example, information regarding a refresh rate at which a display panel may be driven, but is not limited thereto. When the type of the pull-down cadence format is a non-linear pull-down cadence format, the pull-down cadence controller 420 may determine a specific value of the second frame rate according to the performance information PANEL SPEC. As described above, by changing the frame rate demanded according to the performance information of a display, motion judder may be reduced, and a video displayed at an optimal frame rate may be provided to a user.

Figure 5:
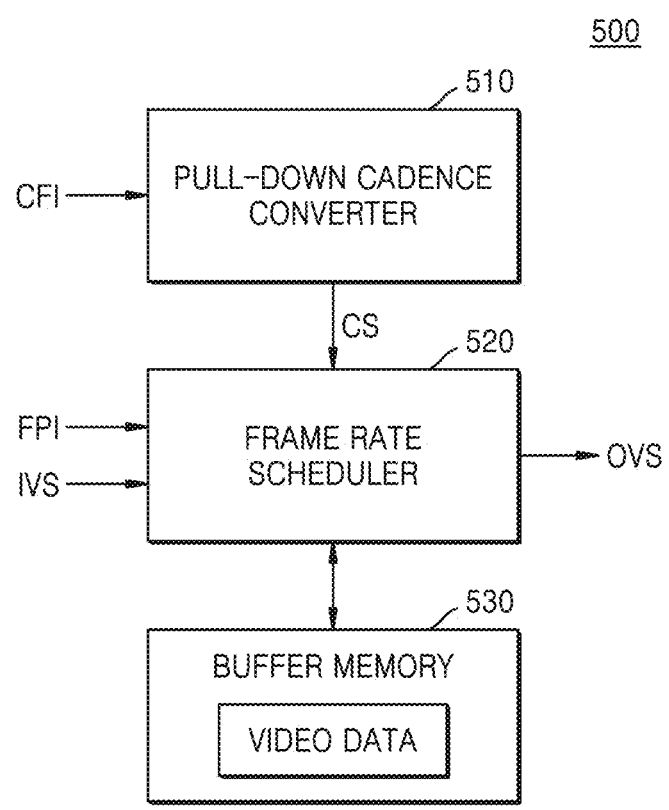
FIG. 5 is a diagram for describing a pull-down cadence controller according to example embodiments of the inventive concepts.

FIG. 5 is a diagram for describing a pull-down cadence controller according to example embodiments of the inventive concepts.

Referring to FIGS. 4 and 5, according to example embodiments, the detection result information DRI may include cadence format information CFI and frame position information FPI. The cadence format information CFI may be information indicating a type of a pull-down cadence format for an input video stream IVS. The frame position information FPI may be information indicating the position of a current frame from among frames included in the input video stream IVS (e.g., the frames 311, 312, 321 to 323, 331, 332, and 341 to 343 shown in FIG. 3).

A pull-down cadence controller 500 may correspond to the pull-down cadence controller 420.

In some example embodiments, the pull-down cadence controller 500 may include a pull-down cadence converter 510, a frame rate scheduler 520, and/or a buffer memory 530.

The pull-down cadence converter 510 may check the type of a pull-down cadence format from the cadence format information CFI. Also, the pull-down cadence converter 510 may output a control signal CS to the frame rate scheduler 520. The control signal CS may be a signal instructing to change the pull-down cadence format.

The frame rate scheduler 520 may control the buffer memory 530 to store the input video stream IVS received from an external device by the unit of frames according to the third frame rate. For example, when the third frame rate is 60 FPS, the frame rate scheduler 520 may transmit a write command, an address, and a frame received every ¹⁄₆₀ seconds to the buffer memory 530.

When a pull-down cadence format is detected, the frame rate scheduler 520 may change the pull-down cadence format to a linear pull-down cadence format in response to the control signal CS. When the pull-down cadence format is changed, the frame rate scheduler 520 may control the buffer memory 530 to read video data VIDEO DATA by units of frames according to the second frame rate and may output read video data VIDEO DATA as an output video stream OVS. For example, when the first frame rate is 24 FPS and the second frame rate is 48 FPS, the frame rate scheduler 520 may transmit addresses respectively corresponding to positions at which frames of the video data VIDEO DATA are stored to the buffer memory 530 and read commands by units of 48 Hz. Also, the frame rate scheduler 520 may output frames of the video data VIDEO DATA sequentially output every 48 Hz. In some example embodiments, during a read operation, the frame rate scheduler 520 may receive the frame position information FPI and control the buffer memory 530 to read from a frame corresponding to the position of a current frame from among frames included in the video data VIDEO DATA.

The buffer memory 530 may store the input video stream IVS as the video data VIDEO DATA. The buffer memory 530 may output stored video data VIDEO DATA to the frame rate scheduler 520. In some example embodiments, the buffer memory 530 may be implemented as a volatile memory like random access memory (RAM), but is not limited thereto.

Figure 6:
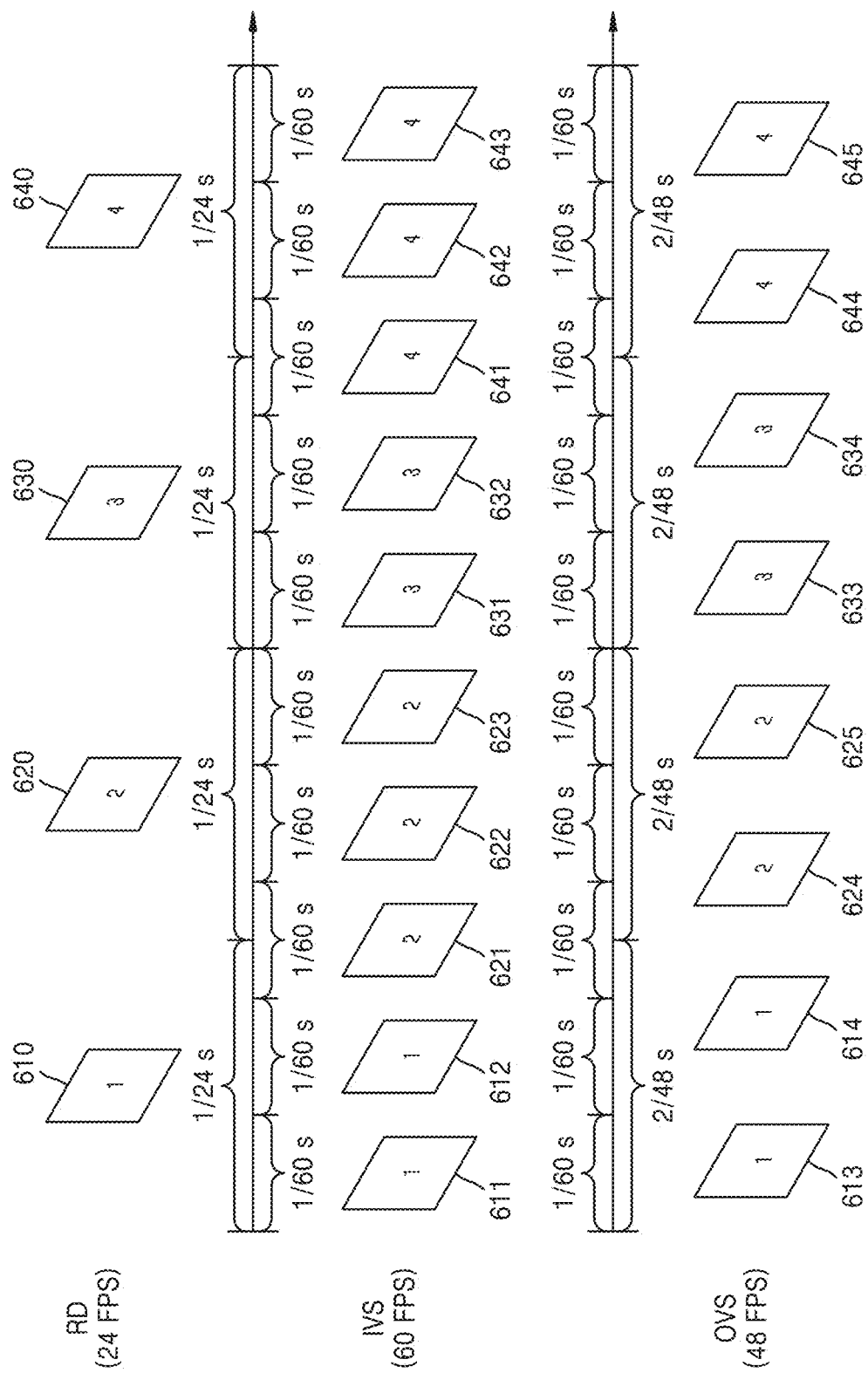
FIG. 6 is a diagram for describing example embodiments of outputting output video data according to a pull-down cadence format.

FIG. 6 is a diagram for describing example embodiments of outputting output video data according to a pull-down cadence format.

Referring to FIGS. 1, 4, and 6, raw data RD may include a plurality of consecutive frames 610, 620, 630, and 640. It is assumed that the first frame rate is 24 FPS. It is assumed that the pull-down cadence format processed by the pull-down driver 12 is 3:2. An input video stream IVS obtained by pulling-down the raw data RD may include a plurality of frames 611, 612, 621 to 623, 631, 632, and 641 to 643. The third frame rate may be 60 FPS. Example embodiments in which the raw data RD is pulled down are the same as that described above with reference to FIG. 3.

The pull-down cadence detector 410 may detect a pull-down cadence format by using the input video stream IVS. In some example embodiments, the cadence format information CFI will indicate that the pull-down cadence format is 3:2. In other words, the detected pull-down cadence format is a non-linear pull-down cadence format.

The pull-down cadence controller 420 may change the detected pull-down cadence format to a linear pull-down cadence format. It is assumed that the linear pull-down cadence format is 2:2. For the linear pull-down cadence format to be applied, the pull-down cadence controller 420 may remove (or skip) any one of three frames 621 to 623 marked with "2" and remove (or skip) any one of three frames 641 to 643 marked with "4".

The output video stream OVS may include a plurality of frames 613, 614, 624, 625, 633, 634, 644, and 645. In some example embodiments, the output video stream OVS may have the second frame rate, and the second frame rate may be an integer multiple of the first frame rate of the raw data RD. Referring to FIG. 6, for example, the first frame rate may be 24 FPS, and the second frame rate may be 48 FPS, which is 2 times 24 FPS.

Figure 7:
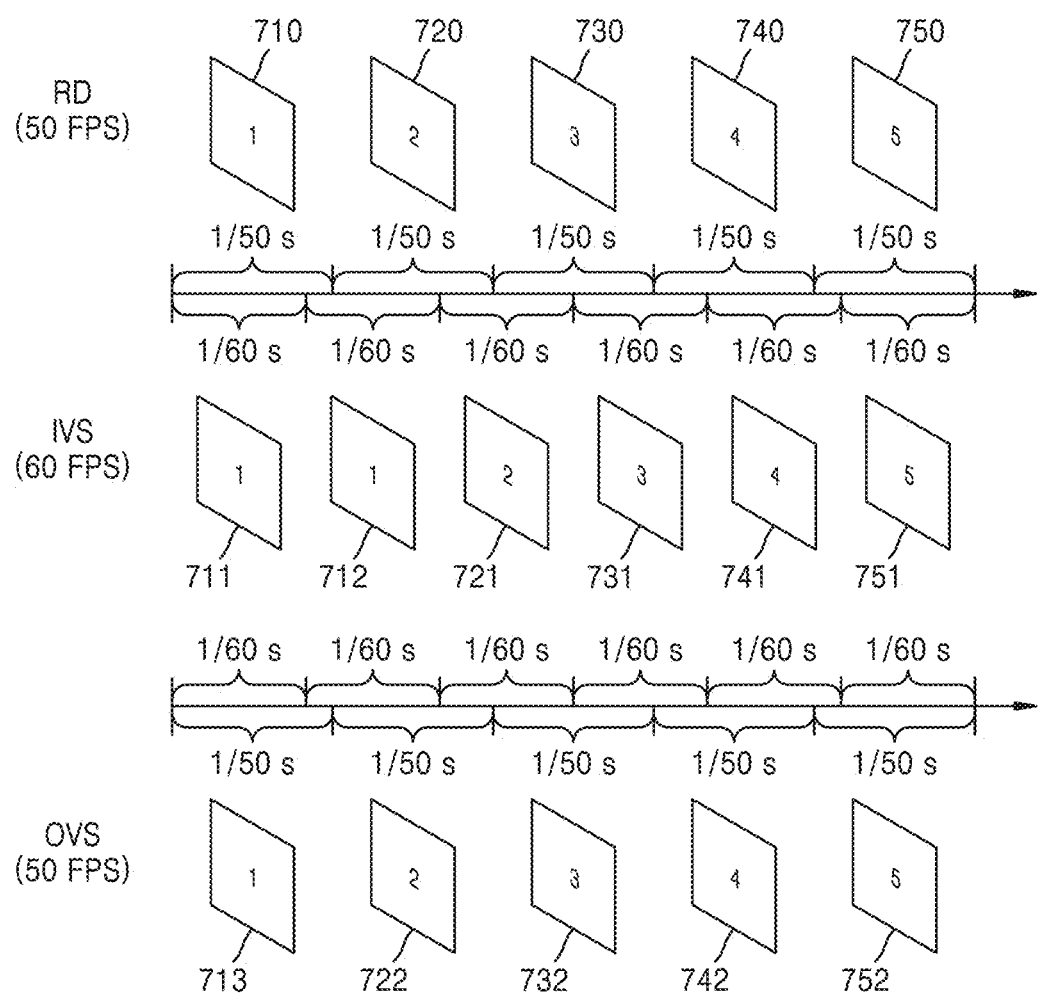
FIG. 7 is a diagram for describing other example embodiments of outputting output video data according to a pull-down cadence format.

FIG. 7 is a diagram for describing other example embodiments of outputting output video data according to a pull-down cadence format.

Referring to FIGS. 1 and 7, raw data RD may include a plurality of consecutive frames 710, 720, 730, 740, and 750. It is assumed that the first frame rate is 50 FPS. It is assumed that the pull-down cadence format processed by the pull-down driver 12 is 2:1:1:1:1. In other words, similar to that shown in FIG. 3, the frame 710 marked with "1" in the raw data RD is extended to two frames, and any one of two frames 711 and 712 marked with "1" in the input video stream IVS may be a repeated frame. The input video stream IVS may include a plurality of frames 711, 712, 721, 731, 741, and 751. The third frame rate may be 60 FPS.

Since the pull-down cadence format is 2:1:1:1:1, the detected pull-down cadence format is a non-linear pull-down cadence format. Therefore, the pull-down cadence controller 420 may remove a repeated frame (e.g., any one of the two frames 711 and 712 marked with "1"). An output video stream OVS may include a plurality of frames 713, 722, 732, 742, and 752, and the second frame rate of the output video stream OVS may be the same as the first frame rate. Referring to FIG. 7, for example, both the first frame rate and the second frame rate may be 50 FPS.

Changing a pull-down cadence format as shown in FIG. 7 such that the second frame rate of the output video stream OVS becomes identical to the first frame rate of the raw data RD may be referred to as a "reverse pull-down method".

FIG. 8 is a diagram showing an example of a table for determining the frame rate of output video data according to a detected pull-down cadence format.

Referring to FIG. 8, a source frame rate may correspond to the first frame rate of raw data (e.g., RD shown in FIG. 7). An input pull-down cadence format may correspond to a pull-down cadence format applied to an input video stream (e.g., IVS shown in FIG. 7). An input frame rate may correspond to the third frame rate of an input video stream.

An output pull-down cadence format may correspond to a pull-down cadence format applied to an output video stream (e.g., OVS shown in FIG. 7). An output frame rate may correspond to the second frame rate of an output video stream.

Referring to example values of the input pull-down cadence format shown in FIG. 8 (e.g., 2:2:2:4, 2:3:3:2, etc.), the input pull-down cadence format is a non-linear pull-down cadence format. Therefore, the input frame rate may be a decimal multiple of the source frame rate. In some example embodiments, the output pull-down cadence format corresponding to each of the input pull-down cadence formats is 2:2 or 1, that is, a linear pull-down cadence format. In some example embodiments, 1 is a pull-down ratio that makes the output frame rate be identical to the source frame rate and may correspond to the above-stated "reverse pull-down method".

The numerical values shown in FIG. 8 are for helping understanding of example embodiments according to the inventive concepts and are not limited to those shown in FIG. 8. Also, although FIG. 8 shows that example values of the input pull-down cadence format correspond to non-linear pull-down cadence formats, the inventive concepts are not limited thereto, and the input pull-down cadence format may be a linear pull-down cadence format like 1 and 2:2. In some example embodiments, the output pull-down cadence format is identical to the input pull-down cadence format.

Figure 9:
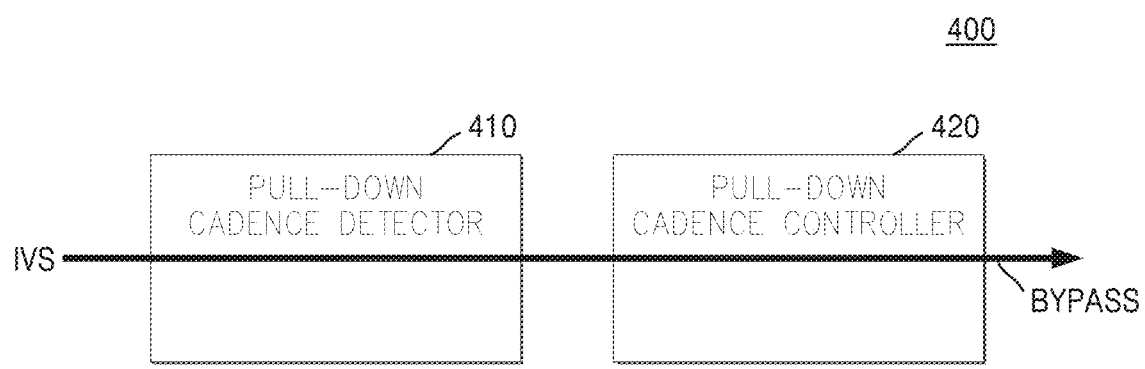
FIG. 9 is a diagram showing an example of bypassing an input video stream according to example embodiments of the inventive concepts.

FIG. 9 is a diagram showing an example of bypassing an input video stream according to example embodiments of the inventive concepts.

Referring to FIG. 9, according to example embodiments, when a detected pull-down cadence format is a linear pull-down cadence, an input video stream IVS may be bypassed. A bypassing path may be, for example, with reference to FIG. 4, a path passing through only the pull-down cadence converter 510 and the frame rate scheduler 520. Alternatively, the bypassing path may include, in another example, with reference to FIG. 5, a first path passing through the pull-down cadence converter 510, the frame rate scheduler 520, and the buffer memory 530 and a second path passing through the buffer memory 530 and the frame rate scheduler 520.

Figure 13:
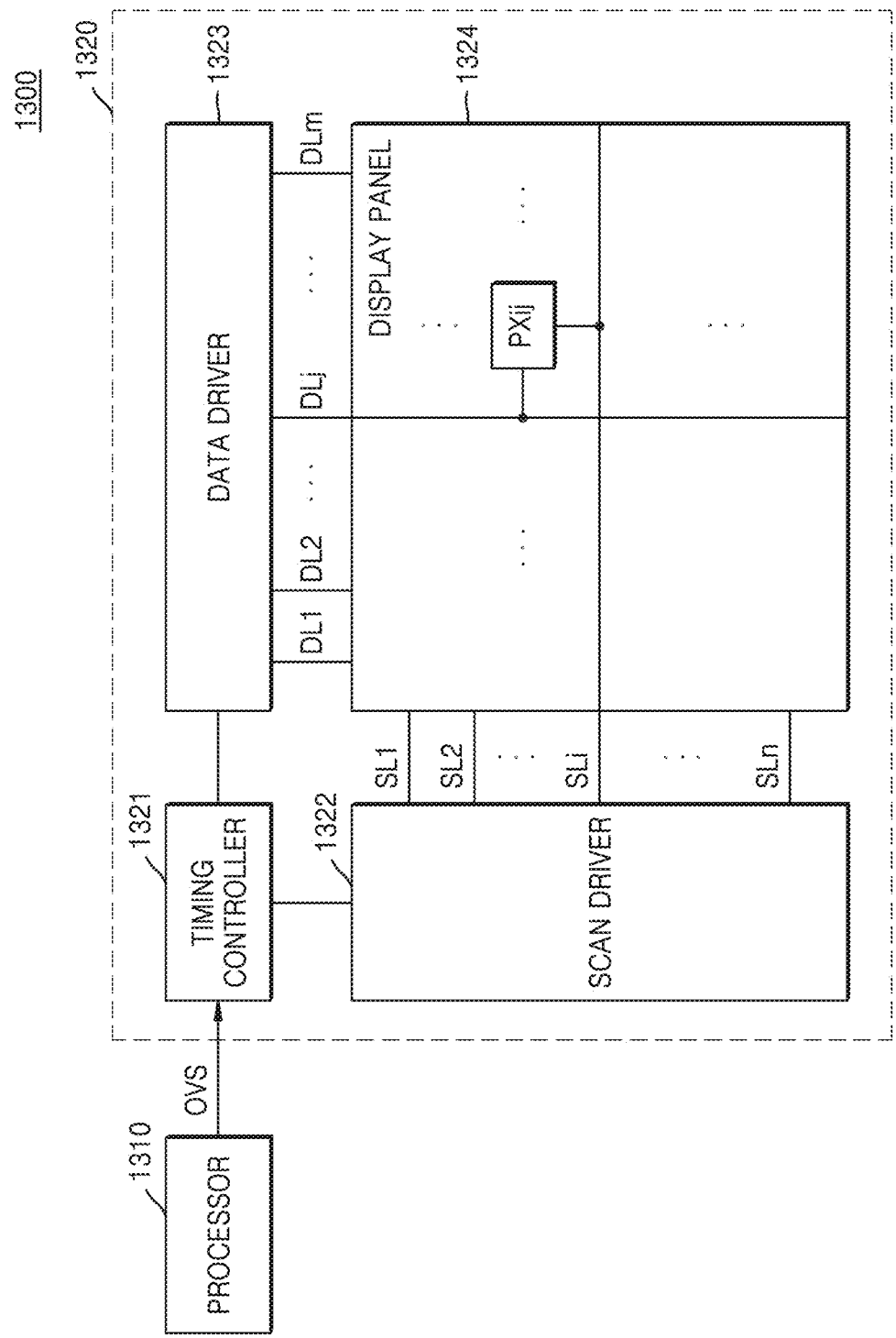
FIG. 13 is a diagram for describing an electronic device according to other example embodiments of the inventive concepts.

In other example embodiments, when a user input module (e.g., 110 of FIG. 1) provides a selection signal, the processor 400 may, in response to the selection signal, bypass an input video stream IVS to a display module (e.g., 140 and 150 of FIG. 1 or 1320 of FIG. 13). As described above, a user experience may be improved by providing a video of smooth motions or a video with reduced soap opera effect according to a user's selection.

Figure 10:
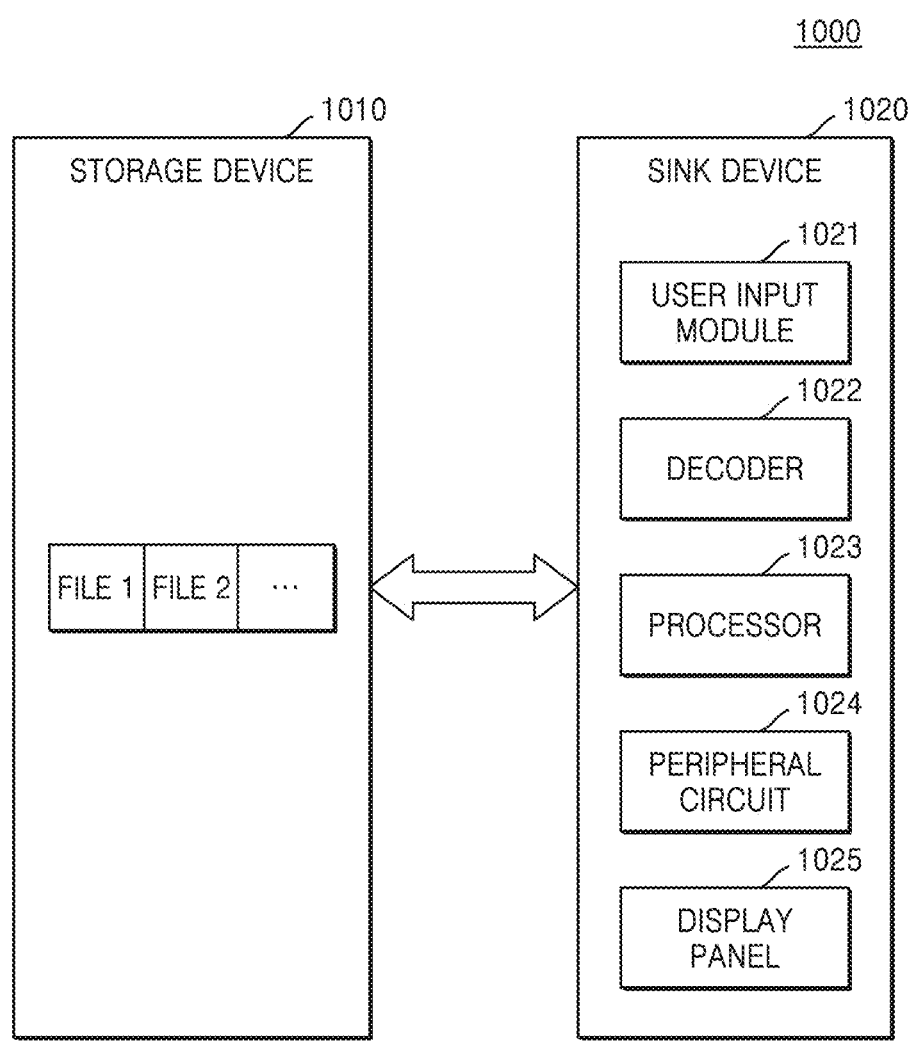
FIG. 10 is a diagram for describing a video output system according to other example embodiments of the inventive concepts.

FIG. 10 is a diagram for describing a video output system according to other example embodiments of the inventive concepts.

Referring to FIG. 10, a video output system 1000 may include a storage device 1010 and/or a sink device 1020.

The storage device 1010 may be a device for storing data. The storage device 1010 may receive a command and an address from the sink device 1020 and may perform various operations according to the command. For example, in response to a read command provided from the sink device 1020, the storage device 1010 may read a selected file from stored multimedia files FILE 1 and FILE 2 and provide a read file (or read data) to the sink device 1020.

The storage device 1010 may be, for example, a flash memory-based storage device. The flash memory may include, for example, NAND flash memory, NOR flash memory, etc. The flash memory-based storage device may include, for example, a solid state drive (SSD), a universal serial bus (USB)-based flash drive device, etc. The storage device 1010 may be implemented as a removable drive. The storage device 1010 may be implemented as a recording medium like a video compact disc (CD) and a digital video disc (DVD).

In some example embodiments, the storage device 1010 may store one or more multimedia files FILE 1 and FILE 2. A multimedia file may be raw data compressed in various formats like moving picture experts group (MPEG) and digital video express (DivX). A multimedia file may include video data and audio data. A multimedia file may include a plurality of frames.

The sink device 1020 may perform the operation of the sink device 100 shown in FIG. 1. The sink device 1020 may include a user input module 1021, a decoder 1022, a processor 1023, a peripheral circuit 1024, and/or a display panel 1025. The user input module 1021, the decoder 1022, the processor 1023, the peripheral circuit 1024, and the display panel 1025 may perform operations identical to those of the user input module 110, the decoder 120, the processor 130, the peripheral circuit 140, and the display panel 150 described above with reference to FIG. 1, respectively.

The processor 1023 may transmit a command and an address to the storage device 1010. The command may be, for example, a read command, and an operation instructed by the read command may be, for example, a read operation. The read operation may be an operation in which the storage device 1010 reads read data stored in the storage device 1010 under the control by the processor 130.

In some example embodiments, the processor 1023 may pull-down raw data according to a pull-down method. In some example embodiments, the raw data may be data stored in the storage device 1010. The pull-down method and the pulling-down operation are the same as the operation of the pull-down driver 12 described above with reference to FIG. 1.

Figure 11:
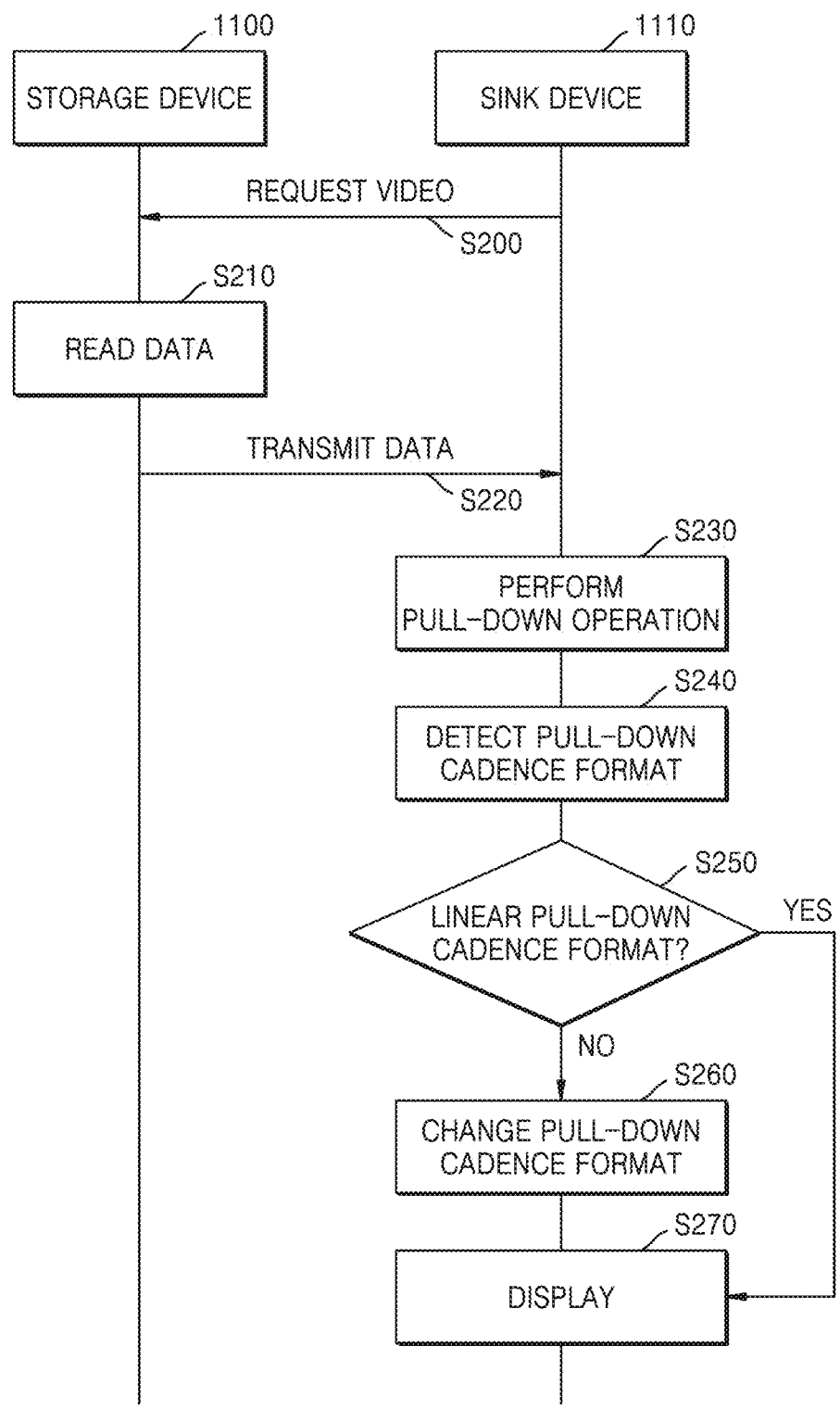
FIG. 11 is a flowchart of a method of outputting a video, according to other example embodiments of the inventive concepts.

FIG. 11 is a flowchart of a method of outputting a video, according to other example embodiments of the inventive concepts.

Referring to FIG. 11, a storage device 1100 and/or a sink device 1110 may correspond to the storage device 1010 and/or the sink device 1020 shown in FIG. 10, respectively.

In operation S200, the sink device 1020 requests a video from the storage device 1100. For example, the sink device 1020 transmits a read command and an address to the storage device 1100 through a wired communication network or a wireless communication network.

In operation S210, the storage device 1100 reads stored data in response to the request. In operation S220, the storage device 1100 transmits data.

In operation S230, the sink device 1020 performs a pull-down operation. The pull-down operation is the same as the pull-down operation in operation S110 described above with reference to FIG. 2.

Operations S240 to S270 are respectively identical to operations S130 to S160 described above with reference to FIG. 2, and thus descriptions thereof will be omitted.

Figure 12:
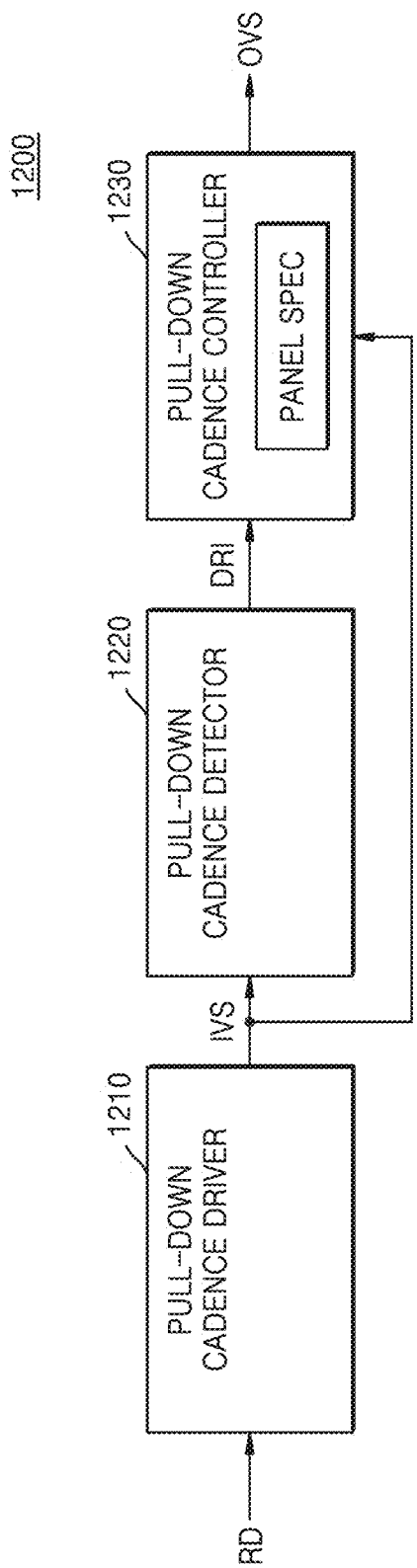
FIG. 12 is a diagram for describing a processor according to other example embodiments of the inventive concepts.

FIG. 12 is a diagram for describing a processor according to other example embodiments of the inventive concepts.

Referring to FIG. 12, a processor 1200 may correspond to the processor 1023 described above with reference to FIG. 10.

In some example embodiments, the processor 1200 may include a pull-down cadence driver 1210, a pull-down cadence detector 1220, and/or a pull-down cadence controller 1230.

The pull-down cadence driver 1210 may pull-down raw data RD provided from a storage device (e.g., 1010 of FIG. 10 or 1100 of FIG. 11) and output an input video stream IVS. The pull-down cadence driver 1210 may perform the operation of the pull-down driver 12 described above with reference to FIG. 1.

The pull-down cadence detector 1220 may detect a pull-down cadence format based on the input video stream IVS and output detection result information DRI. In some example embodiments, the detection result information DRI may include the type of the pull-down cadence format. The pull-down cadence detector 1220 may perform the operation of the pull-down cadence detector 410 described above with reference to FIG. 4.

The pull-down cadence controller 1230 may output an output video stream OVS, based on the input video stream IVS and the detection result information DRI. The output video stream OVS may have the second frame rate that is an integer multiple of the first frame rate of the raw data RD. The pull-down cadence controller 1230 may perform the operation of the pull-down cadence controller 420 described above with reference to FIG. 4.

In some example embodiments, the pull-down cadence controller 1230 may bypass the input video stream IVS or change the third frame rate of the input video stream IVS to the second frame rate and output an output video stream OVS, according to the type of the pull-down cadence format. For example, when the type of the pull-down cadence format is a linear pull-down cadence format, the pull-down cadence controller 1230 may bypass the input video stream IVS. For example, in another example, when the type of the pull-down cadence format is a non-linear pull-down cadence format, the pull-down cadence controller 1230 may output the output video stream OVS.

In other example embodiments, the pull-down cadence controller 1230 may perform a reverse pull-down method. According to the reverse pull-down method, the second frame rate may be the same as the first frame rate. Remaining descriptions of the present example embodiments are the same as those given above with reference to FIG. 7.

FIG. 13 is a diagram for describing an electronic device according to example embodiments of the inventive concepts.

Referring to FIG. 13, an electronic device 1300 may correspond to the sink device 100 shown in FIG. 1 and the sink device 1020 shown in FIG. 10. The electronic device 1300 may perform the operation of the sink device 100 shown in FIG. 1 or the sink device 1020 shown in FIG. 10.

In some example embodiments, the electronic device 1300 may include a processor 1310 and/or a display module 1320.

The processor 1310 may correspond to the processor 130 of FIG. 1, the processor 400 of FIG. 4, the processor 1023 of FIG. 10, or the processor 1200 of FIG. 12. In other words, the processor 1310 may perform the operation of the processor 130 of FIG. 1, the processor 400 of FIG. 4, the processor 1023 of FIG. 10, or the processor 1200 of FIG. 12. The processor 1310 may output an output video stream OVS to the display module 1320.

The display module 1320 may include a timing controller 1321, a scan driver 1322, a data driver 1323, and/or a display panel 1324.

The timing controller 1321 may receive various grayscale values (or grayscale data) and control signals for each video frame from the processor 1310. The timing controller 1321 may render grayscale values in correspondence to the specification of the electronic device 1300. For example, the processor 1310 may provide a red grayscale value, a green grayscale value, and a blue grayscale value for each unit dot. When the display panel 1324 has a pentile structure, a pixel is shared by unit dots adjacent to one another. Therefore, a pixel may not correspond to each grayscale value one-to-one, and grayscale values need to be rendered. When a pixel corresponds to each grayscale value one-to-one, rendering of grayscale values may not be needed. Rendered grayscale values or non-rendered grayscale values may be provided to the data driver 1323. To display frames, the timing controller 1321 may provide control signals suitable for specifications of the scan driver 1322 and the data driver 1323 to the scan driver 1322 and the data driver 1323.

The scan driver 1322 may receive clock signals, a scan start signal, etc. from the timing controller 1321 and generate scan signals to be provided to scan lines SL1, SL2, SLi, and SLn based on the clock signals and the scan start signal. n may be a natural number, and i may be a natural number less than or equal to n. The scan driver 1322 may sequentially supply scan signals having turn-on level pulses to the scan lines SL1, SL2, SLi, and SLn. In some example embodiments, pixels PXij are selected by units of horizontal lines. The scan driver 1322 may include stages configured in the form of shift registers. The scan driver 1322 may generate scan signals by sequentially transferring a scan start signal in the form of a turn-on level pulse to a next stage according to the clock signals.

The data driver 1323 may generate data voltages to be provided to data lines DL1, DL2, DLj, and DLm by using grayscale values and control signals to be synchronized with scan signals supplied from the scan driver 1322. For example, the data driver 1323 may sample grayscale values by using clock signals and apply data voltages corresponding to the grayscale values to the data lines DL1, DL2, DLj, and DLm by units of pixel rows. m may be a natural number, and j may be a natural number less than or equal to m.

In some example embodiments, a peripheral circuit (e.g., the peripheral circuit 140 of FIG. 1 or the peripheral circuit 1024 of FIG. 10) may include the timing controller 1321, the scan driver 1322, and the data driver 1323.

The display panel 1324 may include pixels PXij. The pixels PXij may be defined by data lines and scan lines. In other words, each of the pixels PXij may be connected to a corresponding data line and a scan line.

When a scan signal is supplied, a pixel PXij is selected and charged with a voltage corresponding to a data signal and generates light having certain brightness while supplying a driving current corresponding to a charged voltage to a light emitting diode. The pixel PXij may be implemented in various circuit structures. For example, the pixel PXij may be implemented in a 3T1C structure including a first transistor, a second transistor, a third transistor, and a capacitor.

When the display module 1320 displays a video corresponding to an output video stream OVS received from the processor 1310, a user may capture images by using a measuring device like an optical scope or a high-speed camera and analyze the frame rate and the pull-down cadence format of the output video stream OVS by using the sequence of captured images.

As described above, motion judder may be reduced by linearly changing a detected particular pull-down cadence format.

Also, as described above, a halo phenomenon, a video breaking phenomenon, a soap opera effect, and the occurrence of video latency may be reduced or prevented by linearly changing a detected particular pull-down cadence format instead of an ME/MC method.

In example embodiments, each of elements described above may be and/or include, for example, processing circuitry such as hardware, software, or the combination of hardware and software. For example, the processing circuitry more specifically may include (and/or be included in), but is not limited to, a processor (and/or processors), Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, application-specific integrated circuit (ASIC), graphics processing unit (GPU), etc.

While the inventive concepts have been particularly shown and described with reference to example embodiments thereof, it will be understood that various changes in form and details may be made therein without departing from the spirit and scope of the following claims.

What is claimed is:

1. A processing device comprising:
   a pull-down cadence detector configured to receive an input video stream generated by pulling down raw data from an external device, detect a pull-down cadence format indicating a rate at which the raw data is pulled down based on the input video stream, and output detection result information including a type of the pull-down cadence format; and
   a pull-down cadence controller configured to output an output video stream having a second frame rate that is an integer multiple of a first frame rate of the raw data, based on the input video stream and the detection result information, by bypassing the input video stream or changing a third frame rate of the input video stream to the second frame rate according to the type of the pull-down cadence format,
   wherein the pull-down cadence controller is configured to bypass the input video stream when the type of the pull-down cadence format is a linear pull-down cadence format, and
   wherein the linear pull-down cadence format indicates a pull-down ratio at which the third frame rate is an integer multiple of the first frame rate.

2. The processing device of claim 1,
   wherein the pull-down cadence controller is configured to output the output video stream when the type of the pull-down cadence format is a non-linear pull-down cadence format, and
   the non-linear pull-down cadence format indicates a pull-down ratio at which the third frame rate is a decimal multiple of the first frame rate.

3. The processing device of claim 1,
   wherein the second frame rate
   is identical to the first frame rate.

4. The processing device of claim 1,
   wherein the pull-down cadence controller comprises:
   a buffer memory configured to store the input video stream as video data;
   a pull-down cadence converter configured to identify the type of the pull-down cadence format based on the detection result information and output a control signal instructing to change the pull-down cadence format; and
   a frame rate scheduler configured to control the buffer memory to read the video data by units of frames according to the second frame rate in response to the control signal and output the read video data as the output video stream.

5. The processing device of claim 4,
   wherein the frame rate scheduler is configured to
   control the buffer memory to store the input video stream received from the external device by units of frames according to the third frame rate of the input video stream.

6. The processing device of claim 4,
   wherein the detection result information
   comprises cadence format information indicating the type of the pull-down cadence format and frame position information indicating a position of a current frame from among frames included in the input video stream,
   the pull-down cadence converter is configured to
   identify the type of the pull-down cadence format from the cadence format information, and
   the frame rate scheduler is configured to
   control the buffer memory to read from a frame corresponding to the position of the current frame from among the frames included in the video data.

7. An electronic device comprising:
   a processor configured to
     receive an input video stream generated by pulling-down raw data from an external device,
     detect a pull-down cadence format indicating a ratio at which the raw data is pulled down based on the input video stream, and
     output an output video stream having a second frame rate that is an integer multiple of a first frame rate of the raw data based on the pull-down cadence format by bypassing the input video stream to a display module or changing a third frame rate of the input video stream to the second frame rate according to a type of the pull-down cadence format, and
     bypass the input video stream when the type of the pull-down cadence format is a linear pull-down cadence format; and
   the display module configured to display a video corresponding to the output video stream,
   wherein the linear pull-down cadence format indicates a pull-down ratio at which the third frame rate is an integer multiple of the first frame rate.

8. The electronic device of claim 7,
   wherein the processor is configured to
   output the output video stream when the type of the pull-down cadence format is a non-linear pull-down cadence format, and
   the non-linear pull-down cadence format indicates a pull-down ratio at which the third frame rate is a decimal multiple of the first frame rate.

9. The electronic device of claim 8,
   wherein the processor is configured to
   store in advance performance information regarding performance of the display module, and is configured to determine the second frame rate according to the performance information.

10. The electronic device of claim 7,
    wherein the second frame rate
    is identical to the first frame rate.

11. The electronic device of claim 7,
further comprising a user input module configured to receive a selection signal indicating information selected by a user and output the selection signal to the processor, and
the processor is configured to
bypass the input video stream to the display module in response to the selection signal.

12. A processing device comprising:
a pull-down cadence driver configured to pull down raw data provided from a storage device and output an input video stream generated by pulling down the raw data;
a pull-down cadence detector configured to detect a pull-down cadence format indicating a ratio at which the raw data is pulled down based on the input video stream and output detection result information including a type of the pull-down cadence format; and
a pull-down cadence controller configured to
output an output video stream having a second frame rate that is an integer multiple of a first frame rate of the raw data, based on the input video stream and the detection result information, by bypassing the input video stream or changing a third frame rate of the input video stream to the second frame rate according to the type of the pull-down cadence format, and
bypass the input video stream when the type of the pull-down cadence format is a linear null-down cadence format,
wherein the linear pull-down cadence format indicates a pull-down ratio at which the third frame rate is an integer multiple of the first frame rate.

13. The processing device of claim 12,
wherein the pull-down cadence controller is configured to
output the output video stream when the type of the pull-down cadence format is a non-linear pull-down cadence format, and
the non-linear pull-down cadence format
indicates a pull-down ratio at which the third frame rate is a decimal multiple of the first frame rate.

14. The processing device of claim 12,
wherein the second frame rate
is identical to the first frame rate.

* * * * *